United States Patent
Yu et al.

(10) Patent No.: US 7,029,159 B2
(45) Date of Patent: Apr. 18, 2006

(54) REFLECTOR CONFIGURATION OF A BACK-LIGHT MODULE

(75) Inventors: Hong-Tien Yu, Pa-Te (TW); Cheng-Min Liao, Tai-Chung (TW)

(73) Assignee: Chunghwa Picture Tubes,Ltd., Taipei (TW)

( * ) Notice: Subject to any disclaimer, the term of this patent is extended or adjusted under 35 U.S.C. 154(b) by 169 days.

(21) Appl. No.: 10/419,078

(22) Filed: Apr. 21, 2003

(65) Prior Publication Data

US 2004/0207994 A1 Oct. 21, 2004

(51) Int. Cl.
*F21V 7/04* (2006.01)
(52) U.S. Cl. .................. 362/632; 362/633; 362/600
(58) Field of Classification Search .............. 362/26, 362/31, 609, 614, 632, 633, 634, 600; 349/61, 349/65, 67

See application file for complete search history.

(56) References Cited

U.S. PATENT DOCUMENTS

| 5,280,372 | A | * | 1/1994 | Horiuchi ...................... 349/65 |
| 5,694,190 | A | * | 12/1997 | Matsumoto et al. ........ 349/151 |
| 5,729,310 | A | * | 3/1998 | Horiuchi et al. ............... 349/62 |
| 6,166,788 | A | * | 12/2000 | Ha et al. ...................... 349/58 |
| 6,392,724 | B1 | * | 5/2002 | An et al. ...................... 349/58 |
| 2003/0179580 | A1 | * | 9/2003 | Ito et al. ..................... 362/306 |

FOREIGN PATENT DOCUMENTS

| JP | 07-230089 | 8/1995 |
| JP | 2001-06006 | 3/2001 |

* cited by examiner

*Primary Examiner*—Sandra O'Shea
*Assistant Examiner*—Jacob Y. Choi
(74) *Attorney, Agent, or Firm*—Birch,Stewart,Kolasch & Birch,LLP

(57) ABSTRACT

The present invention relates to a reflector configuration of a back-light module, and particularly to the coupling of a lamp reflector and a lamp cover of the back-light module. The lamp reflector in the present invention wraps a lamp around and is fastened on the light-guiding plate. A lamp cover is fastened onto the light-guiding plate, and contacts without wrapping around the lamp reflector.

20 Claims, 7 Drawing Sheets

| mA  Point °C minutes | A | B | C |
|---|---|---|---|
| | 6mA | 6mA | 6mA |
| 4 minutes | 44.6°C | 39.6°C | 40.2°C |
| 6 minutes | 45.2°C | 40.3°C | 41.5°C |
| 10 minutes | 46.5°C | 40.9°C | 42.1°C |
| 30 minutes | 48.3°C | 42.1°C | 43.4°C |

| mA＼Point ｜℃＼minutes | A | B | C |
|---|---|---|---|
| | 5.5mA | 5.5mA | 5.5mA |
| 5 minutes | 48.9°C | 43.4°C | 48.3°C |
| 10 minutes | 48.8°C | 43.4°C | 48.9°C |
| 30 minutes | 50.2°C | 44.6°C | 50.2°C |

REFLECTOR CONFIGURATION OF A BACK-LIGHT MODULE

BACKGROUND OF THE INVENTION

1. Field of the Invention

The present invention relates to a reflector configuration of a back-light module of an LCD (Light Crystal Display), and particularly to the coupling of a lamp reflector and a lamp cover of the back-light module.

2. Description of the Prior Art

A back-light module is a key component of a LCD panel to supply good and uniform illumination for the best possible display of the LCD panel. A lamp reflector fastens on a light guide plane to reflect light emitting from a lamp into the light guide plane. A lamp cover fastens the lamp in a designed position. A well-designed lamp reflector and a well-designed lamp cover also lowers the temperature around the lamp. Changing the shape of the lamp reflector and the lamp cover is a method for improving the back-light module and LCD.

As shown in FIG. 1, it is a three-dimensional picture of a back-light module in the prior art. The back-light module comprises a light-guide plate 10, a lamp cover 12 which fastens on a transparent plane (not shown in FIG. 1) the light-guide plate 10. The lamp cover 12 includes three parts—a first part 14, a second part 16, and a third part 18. The first part 14 connects with an end of the second part 16 by a curve. Another end of the second part 16 connects with the third part 18, and the second part 16 is perpendicular to the third part 18. A lamp reflector 20 includes two parts—a first-reflective plane 22 and a second-reflective plane 24. The first-reflective plane 22 connects with the second-reflective plane 24, and is perpendicular to the second-reflective plane 24. The first part 14 of the lamp cover 12 contacts with the light-guide plate 10. A part of the second part 16 of the lamp cover 12 contacts with the outside of the first-reflective plane 22. A surplus part of the second part 16 of the lamp cover 12 connects with the first part 14 of the lamp cover 12 by a curve, and the rest part of the second part 16 is suspended in the air. The third part 18 of the lamp cover 12 contacts with the outside of the second-reflective plane 24.

A cross-sectional view along the dotted line 2 is shown in FIG. 2. The lamp cover 12 is fastened on the light-guide plate 10. The lamp cover 12 includes the first part 14, the second part 16, and the third parts 18. The first part 14 connects with the end of the second part 16 by a curve. The curve between the first part 14 and the second part 16 enhances the mechanical-strength of the lamp cover 12 to prevent the lamp cover 12 from breaking up. Another end of the second part 16 connects with the third part 18, and the second part 16 is perpendicular to the third part 18.

The lamp reflector 20 includes three parts—the first-reflective plane 22, the second-reflective plane 24, and a third-reflective plane 28 that was not discussed above. The first-reflective plane 22 connects with an end of the second-reflective plane 24, and is perpendicular to the second-reflective plane 24. The other end of the second-reflective plane 24 connects with the third-reflective plane 28 and is perpendicular to the third-reflective plane 28. The first-reflective plane 22, the second-reflective plane 24 and the third-reflective plane 28 connect to each other to form a box-like space wherein a lamp 26 is positioned. The light emitted from the lamp 26 may go toward the light-guide plate 10 or reflected by the third reflective planes to go toward the light-guide plate 10.

The lamp reflector 20 fastens on a side of the light-guide plate 10 by clipping a part of the third-reflector plane 28 of the lamp reflector 20 and a fixed-clipping section 30 on the light-guide plate 10. The first part 14 of the lamp cover 12 contacts with a transparent plane (not marked) of the light-guide plate 10 to fasten the lamp cover 12 on the light-plate 10. A part of the second part 16 of the lamp cover 12 contacts with the outside of the first-reflective plane 22. The rest part of the second part 16 of the lamp cover 12 is hung in the air and connects with the first part 14 of the lamp cover 12 by a curve. The third part 18 of the lamp cover 12 contacts with the outside of the second-reflective plane 24 of the lamp reflector 20 to firm the lamp reflector 20 on the light-guide plate 20. The thermal energy created from the light can pass through the lamp reflector 20 to the lamp cover 12 by heat conduction, and radiate from the lamp cover 12. The efficiency of radiating thermal energy becomes better as the area of the lamp cover 12 is bigger.

The lamp 26 is placed inside the lamp reflector 20. Light emitting from the lamp 26 illuminates into the light-guide plate 10 uniformly and well-lit because three reflector planes reflect the light emitting from the lamp 26 to the light-guide plate. Because the lamp 26 itself and the light emitted from the lamp 26 produces thermal energy, the heat conduction of the lamp reflector 20 has to be very good for radiating heat to prevent heat problems in the LCD. The lamp reflector 20 has to be placed in a well-designed position to reflect the light emitted from the lamp 26 into the light-guide plate 10 as best as possible. If the lamp reflector 20 is not fastened well on to the well-designed place, the light reflected from the lamp reflector 20 must emit into the light-guide plate 10 disproportionately. It means that the lamp reflector 20 is improved for some purposes, the lamp reflector has still to be placed in a well-designed position.

The lamp cover 12 fastens the lamp reflector 20, the lamp 26 and itself on the light-guide plate 10, and the lamp cover 12 enhances the mechanical-strength of the back-light module. The lamp cover 12 is also a cooler for the lamp 26. The lamp cover 12 in the prior art contacts and fastens on a transparent plane of the light guide plate, and also wraps the outside of the three reflected planes of the lamp reflector 20. Thermal energy produced from the lamp 26 and the light emitted from the lamp 26 has to pass through the lamp reflector 20 first, and then pass through the lamp cover 12 to radiate from the surface of the lamp cover 12. Because the cooling efficiency in the prior art is not good enough, we improved the design of the lamp cover 12 and the lamp reflector 20. Because the lamp cover 12 warps the lamp reflector 20, it's very hard to decrease the thickness and weight of the back-light module.

The lamp reflector 20 increases thickness of the back-light module so that we should improve the design to decrease thickness of the back-light module.

When the cooling measure of the area are bigger, the cooling efficiency is better to stable the back-light module operation more. Increasing the area of the lamp cover 12 increases the cost and the weight of the lamp cover 12 so that the back-light module increases the weight itself. It's a hard work to decrease the thickness and the weight of the back-light module without decreasing the cooling efficiency of the lamp cover 12 and the lamp reflector 20. The present invention improves a lighter, thinner and a better cooling design of the back-light module, that is described below.

SUMMARY OF THE INVENTION

In accordance with the present invention, a main objective of the present invention is to provide a reflector coupling of a lamp reflector and a lamp cover of a back-light module.

It is another objective of the present invention to provide a reflector configuration that increases the cooling efficiency of the back-light module. The lamp reflector and the lamp cover fasten on a light-guide plate, and a part of the lamp cover contacts but not wraps the lamp reflector in the present invention, so that the bigger-cooling area increases the cooling efficiency of the back-light module.

It is another objective of the present invention to provide a reflector configuration that decreases the thickness and the weight of the back-light module by fastening the lamp cover that contacts but does not wrap the lamp reflector on the light guide plate.

It is another objective of the present invention to provide a reflector configuration that decreases the cost and the weight of the back-light module by decreasing the area of the lamp cover.

One more objective of the present invention is to provide the reflector configuration that increases the illumination of the back-light guide by fastening the lamp cover that contacts but does not wrap the lamp reflector on the light-guide plate. The tube electric current on the lamp reflector in the present invention is larger than the tube electric current on the lamp reflector in the prior art so that the illumination increases as the tube electric current increases.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

A preferred embodiment of the present invention that provides a reflector configuration of a back-light module will now be described in greater detail. Nevertheless, it should be recognized that the present invention can be practiced in a wide range of other embodiments besides those explicitly described, and the scope of the present invention is expressly not limited except as specified in the accompanying claims.

Figure 3:
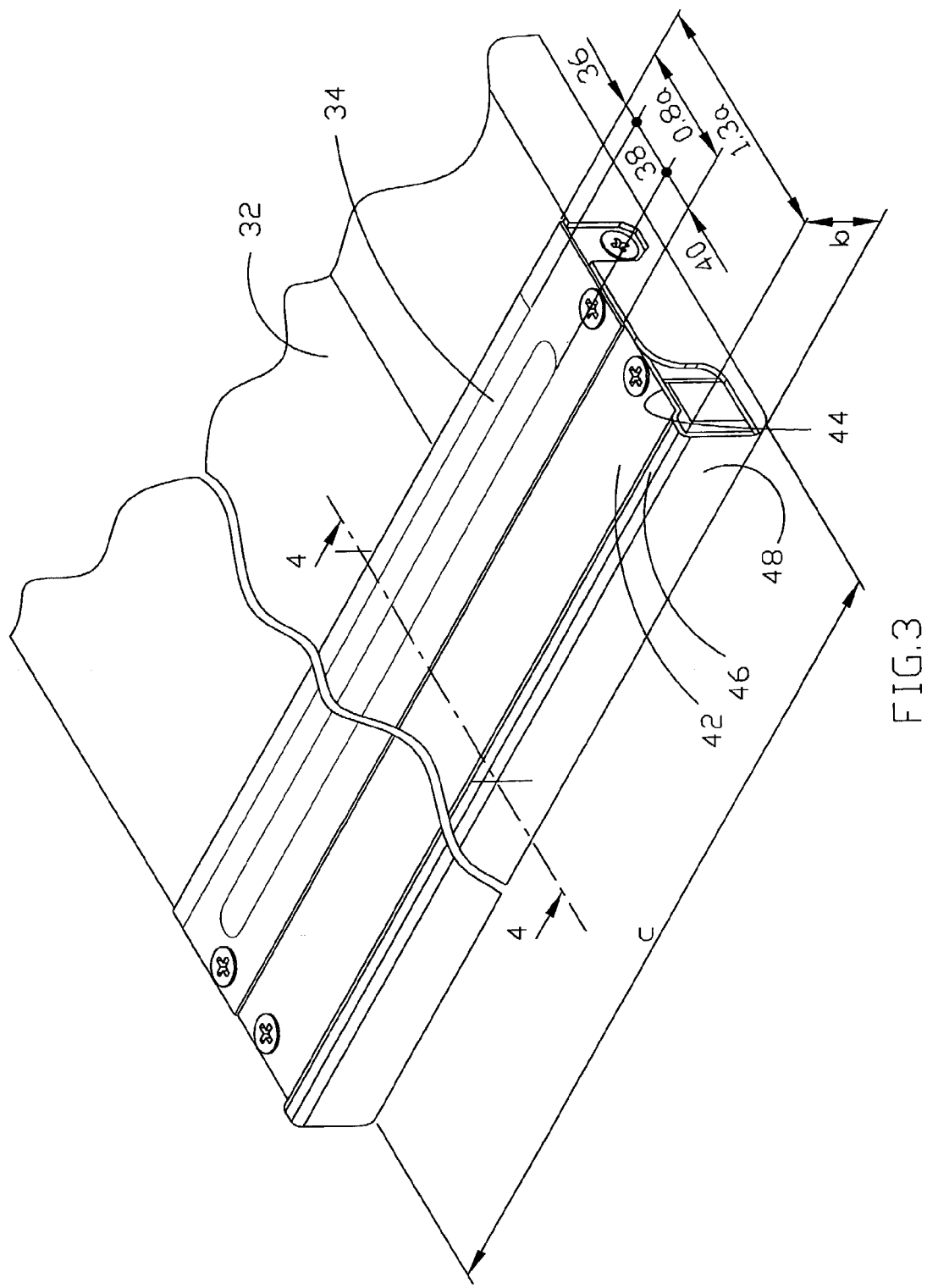
FIG. 3 is a three-dimensional perspective view showing a side-part of a back-light module in the present art.

FIG. 3 is a three-dimensional picture showing a side-part of a back-light module in the present art. The side-part of the back-light module in the present art comprises a light-guide mechanism, a light-guide plate 32, a lamp cover 34 that fastens on a transparent plane (not marked) the light-guide plate 32. The lamp cover 34 includes three parts—a first part 36, a second part 38 and a third part 40. The first part 36 connects with an end of the second part 38 by a first curve. The third part 40 connects with the other end of the second part 38 by a second curve. The first curve, the second curve and a third curve that is formed in the second part 38 enhance the mechanical-strength of the lamp cover 34 to prevent the lamp cover 34 from breaking up.

Figure 4:
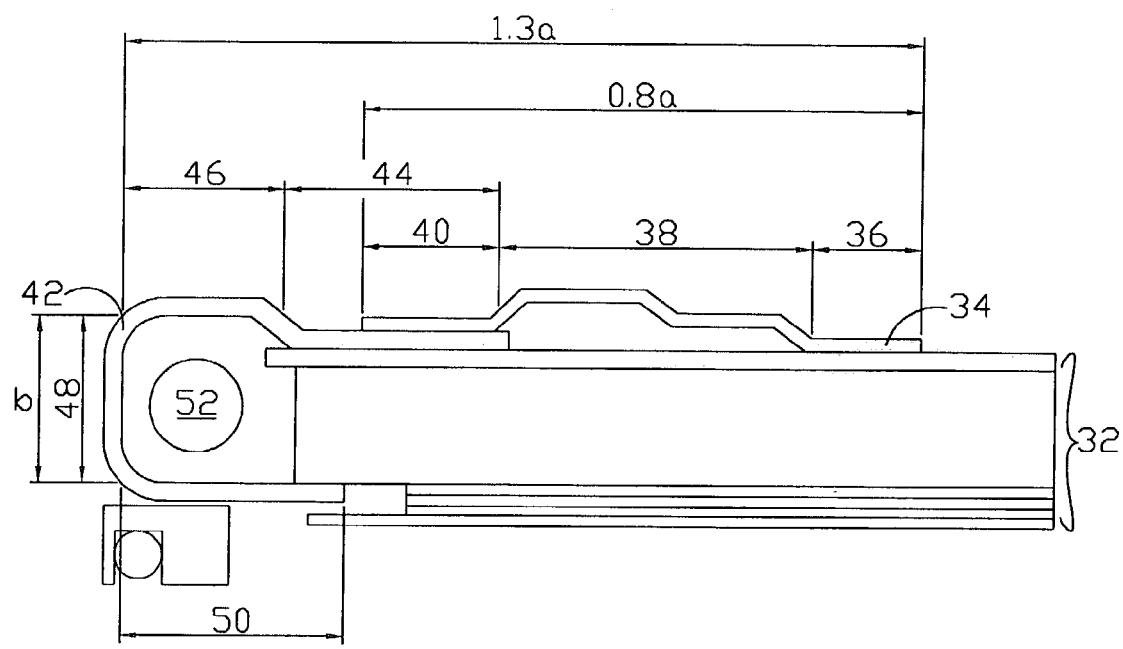
FIG. 4 is a cross-sectional view of the side-part of the back-light module in the present art.

The lamp reflector 42 comprises a fastening-clipping part 44, a first-reflective plane 46 and a second-reflecting plane 48. The fastening-clipping part 44 contacts with a transparent plane that is not marked with the light-guide plate 32, and connects with an end of the first-reflective plane 46. The other end of the first-reflective plane 46 connects with the second-reflecting plane 48 perpendicularly. The first part 36 of the lamp cover 34 contacts with the transparent plane that is not marked to fasten with the lamp cover 34 itself on the light-guide plate 32. The third part 40 of the lamp cover 34 contacts with the first fastening-clipping part 44. FIG. 4 is a cross-sectional view along a dotted line 4 of the side-part of the back-light module in the present art.

As shown in FIG. 4, the lamp reflector 42 further comprises a third-reflector plane 50 that connects with the second-reflector plane 48 perpendicularly. The first-reflective plane 46, the second-reflective plane 48 and the third-reflective plane 50 connects to each other to form a box-like space. An end of the third-reflecting plane 50 connects with the second-reflector plane 48 and the other end of the third-reflecting plane 50 contacts with another transparent plane (not marked). The other end of the third-reflecting plane 50 and the fastening clipping part 44 clipped to the light-guide plate 32 together to fasten the lamp reflector 42 onto the light-guide plate 32. There is an illuminating component (a lamp 52) such as a plural light-emitting diode, a halo-lamp and a CCFL . . . etc. placed inside the box-like space formed by the first-reflective plane 46, the second-reflective plane 48 and the third-reflective plane 50.

When turns on the lamp 52 and operates it, some light emitted from the lamp 52 enters the light-guide plate 32 directly and rest light emits to the first-reflective plane 46, the second-reflective plane 48 and the third-reflective plane 50 of the lamp reflector 42. Some light emitting to the first-reflective plane 46, the second-reflective plane 48 and the third-reflective plane 50 of the lamp reflector 42 is reflected into the light-guide plate 32 and rest light transfers into thermal energy. A back-light module with high temperature operates more insatiably than a back-light module which operates at room temperature. It is important to design a good mechanism to cool down the thermal energy produced from the lamp and transferred from light to stable the operation of the back-light module.

The thermal energy that is inside the lamp reflector 42 transmits to the surface of the lamp cover 34 in several ways. Thermal energy produced by the lamp 52 itself and transferred from the light that's emitted from the lamp 52 is transported to the light-guide plate 32 and the reflecting plane 46, 48 and 50 by 'Thermal convention' and 'Thermal Radiation'. Some thermal energy transported to the light-guide plate 32 is conducted to the two transparent planes and then conducted to the fastening-clipping part 44 and the third-reflective plane 50 of the lamp reflector 42, and the first-part 36 of the lamp cover 34 by 'Thermal Conduction'. The material of lamp reflector 42 and the lamp cover 34 are high heat conduction material such as copper or aluminum. Some thermal energy conducted to the fastening clipping part 44 and the third-reflective plane 50 of the lamp reflector 42 and the first part 36 of the lamp cover 34 will be cooled very quickly by 'Thermal Convention'. Some thermal energy conducted to fastening-clipping part 44 and the third-reflective plane 50 of the lamp reflector 42 and the first part 36 of the lamp cover 34 will be conducted to the second-part 38 and the third-part 40 of the lamp cover 34 and the first-reflective plane 46, the second-reflective plane 48 and the third-reflective plane 50 of the lamp reflector 42, and then will be cooled very quickly by 'Thermal Convention'. If the unnecessary thermal energy gets away, the back-light module will operate well.

Some thermal energy directly transported from the lamp 52 to the first-reflective plane 46, the second-reflective plane 48 and the third-reflective plane 50 of the lamp reflector 42 is cooled from the surface of three reflective planes 46, 48 and 50 to the air by 'Thermal convention'. Some thermal energy directly transported from the lamp 52 to the first-reflective plane 46, the second-reflective plane 48 and the third-reflective plane 50 of the lamp reflector 42 is conducted to the fastening-clipping part 44 of the reflector 42 and the lamp cover 34, and then is cooled by 'Thermal convention'. Thus, the cooling efficiency is better as the area of the lamp reflector 42 and the lamp cover 34 is bigger.

As shown in FIG. 4, the third part 40 of the lamp cover 34 is the only part that contacts with the fastening-clipping part 44 of the lamp reflector 42. The lamp cover 34 in the present invention is different from the lamp cover 12 that wraps the lamp reflector 20 in the prior art. The cost of the lamp cover 34 in the present invention is cheaper than the cost of the lamp cover 12 in the prior art. The designer of the lamp cover 34 is unnecessary to design a lamp cover corresponding to a lamp reflector for wrapping the lamp reflector. Fabricating time of the lamp cover and the lamp reflector 42 becomes faster because the lamp cover 34 fastens on but does not wrap the lamp reflector 42. The thickness of the back-light module becomes thinner because the lamp cover 34 does not wrap around the lamp reflector 42 but contacts the fastening-clipping part 44 of the lamp reflector 42.

A lamp cover in the present invention contacts but does not wrap the lamp reflector to fasten the lamp cover itself and the lamp reflector on a light-guide plate of a back-light module. The coupling of the lamp cover and the lamp reflector decreases the thickness of the back-guide module, increases the cooling the area of the lamp reflector and the lamp cover to improve cooling efficiency, decreasing the cost of the lamp cover, decreasing the process of designing and fabricating the lamp cover to wrap around the lamp reflector, and increase the fabricating efficiency that fastens the lamp cover and the lamp reflector on the light-guide plate of the back-light module.

Figure 1:
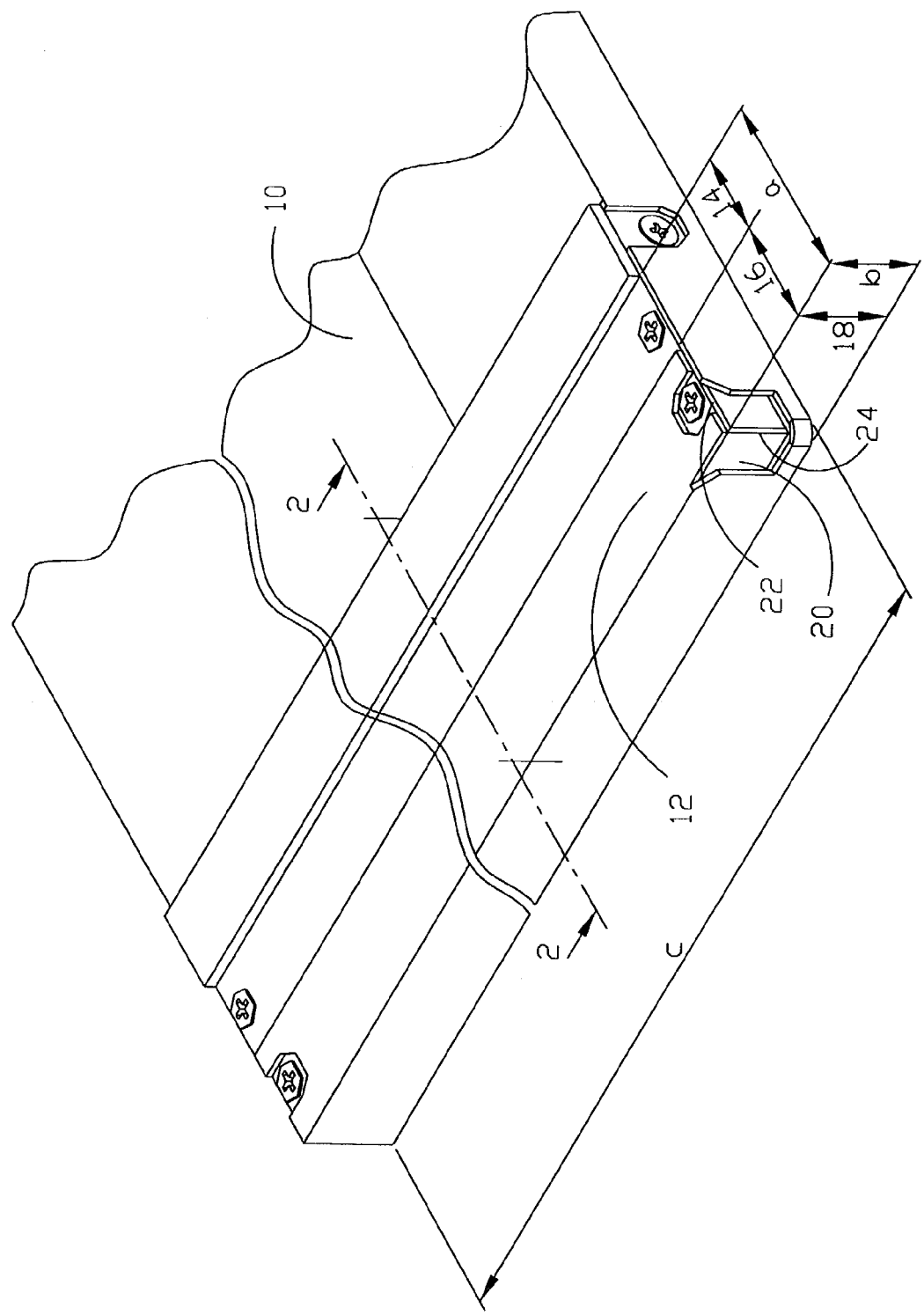
FIG. 1 is a three-dimensional perspective view showing a side-part of a back-light module in the prior art.
Figure 2:
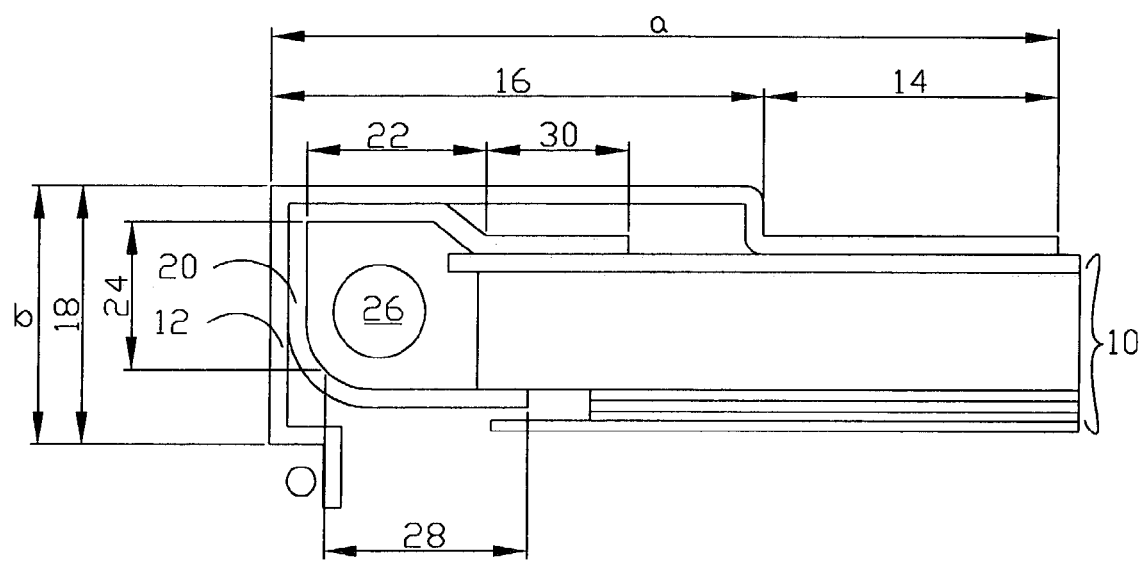
FIG. 2 is a cross-sectional view of the side-part of the back-light module in the prior art.

The increasing area of the lamp cover and the lamp reflector for cooling in the present art as shown in FIG. 4 is bigger than the area of the lamp cover and the lamp reflector for cooling in the prior art as shown in FIG. 2. FIG. 4 is a cross-sectional view of the side-part of the back-light module in the present art. Compare the lamp cover 34 in the present invention in FIG. 4 with the lamp cover 12 in the prior art in FIG. 2. We will see that the cooling area in the present invention is bigger than the cooling area in the prior art. As shown in FIG. 2, the total width of the lamp cover 12 and the lamp reflector 20 is c, the total height of the three part 18 of the lamp cover 12 is b, the total length of the first part 14 and the second part 16 of the lamp cover 12 is a, and the cooling area in the prior art is approximately $[(a+b) \times c]$. As shown in FIG. 4, the width of the second-reflecting plane 48 of the lamp reflector 42 that equals the width of the lamp cover 12 in the prior art is b, the total length of the lamp cover 34 and the lamp reflector 42 is c, the total length of the three part 36, 38, and 40 of the lamp cover 34 is 0.8a, and the cooling area of the lamp cover 34 and the lamp reflector 42 is $[(1.3a+b) \times c]$. The cooling area in the present is bigger than the area in the prior art approximately 0.5ac.

The area of the lamp cover 12 in the prior art, as shown in FIG. 2, is approximately $(a+b) \times c$. The area of the lamp cover 42 in the present art, as shown in FIG. 4, is approximately 0.8ac. The material of the lamp cover 34 is lesser than the material of the lamp cover 12 approximately $(0.2a+b) \times c$. Because the material of the lamp cover in the present is lesser, the total weight of the back-light module is lighter than the weight of the back-light module in the prior art.

As shown in FIG. 4, the thickness of the back-light module in the present invention is equal or thinner than the thickness of the back-light module in the prior art because the lamp cover 34 does not wrap around the lamp reflector 42. The coupling of the lamp cover and the lamp reflector in the present invention decreases the thickness and the weight of the back-light guide.

Figures 5, 6:
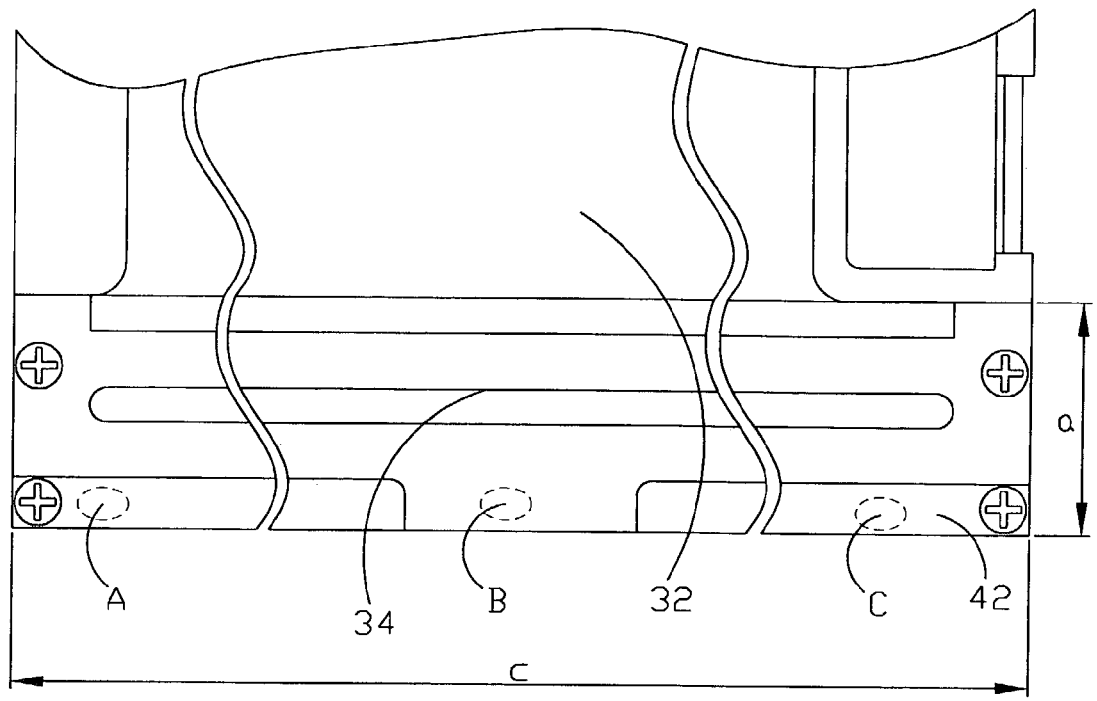
FIG. 5 is a vertical view of the side-part of the back-light module in the present art.
FIG. 6 is a data list of the tube-electrical current on the side-part of the back-light module in the prior art.
Figures 7, 8:
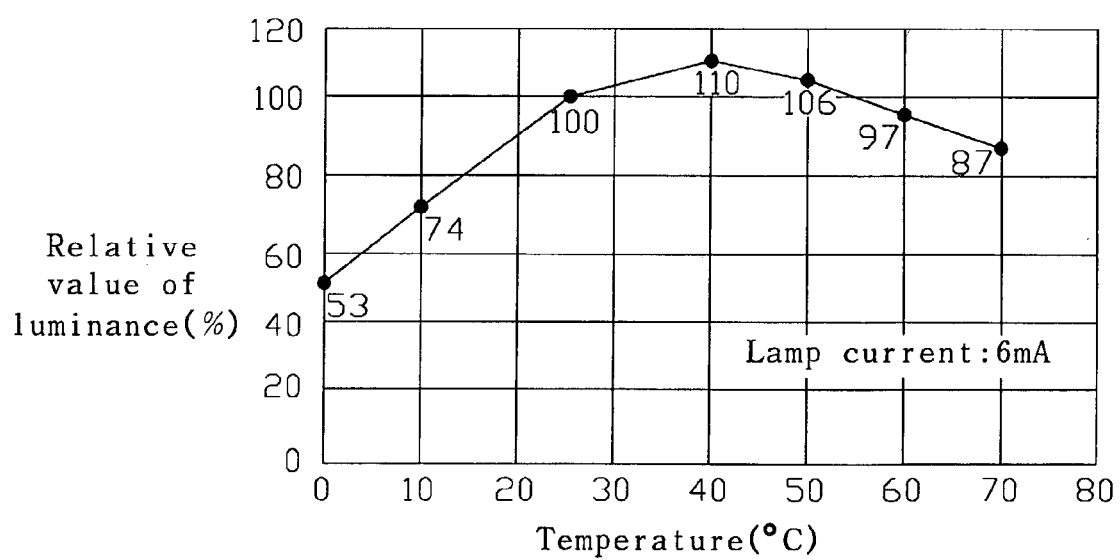
FIG. 7 is a data list of the tube-electrical current on the side-part of the back-light module in the present art.
FIG. 8 is a relationship data between the tube-electrical current and the illumination.

FIG. 6 is a data list of the temperature when inputting the tube-electrical current such as 6 mA on the side-part with the lamp cover 34 of the back-light module in the present invention that is recorded by time. Three points A, B and C are marked in FIG. 5. FIG. 7 is a data list of the temperature when inputting the tube-electrical current such as 6 mA on the side-part of the back-light module without the lamp cover 34 in the present art that is recorded by time. As shown in FIG. 7, the data of the temperature is 48.8° C., 43.4° C. and 48.9° C. respectively at 10 minutes of the point A, B and C. As shown in FIG. 6, the data of the temperature is 46.5° C., 40.9° C. and 42.1° C. respectively at 10 minutes of the point A, B and C with the lamp cover 34. The data of the temperature without the lamp cover 34 is larger than the data of the temperature with the lamp cover 34 at 10 minutes. As shown in FIG. 7, the data of the temperature without lamp cover 34 is 50.2° C., 44.6° C. and 50.2° C. respectively at 30 minutes of the point A, B and C. As shown in FIG. 6, the data of the temperature with lamp cover 34 are 48.3° C., 42.1° C. and 43.4° C. respectively at 30 minutes of the point A, B and C. The data of the temperature without the lamp cover 34 is larger than the data of the temperature with the lamp cover 34 at 30 minutes. FIG. 8 is a relationship data between the temperature and the illumination. The highest data of the illumination is around 40° C. so that the illumination of the back-light guide with the lamp cover 34 in the present invention is higher than the illumination of the back-light guide without the lamp cover 34.

Figure 9:
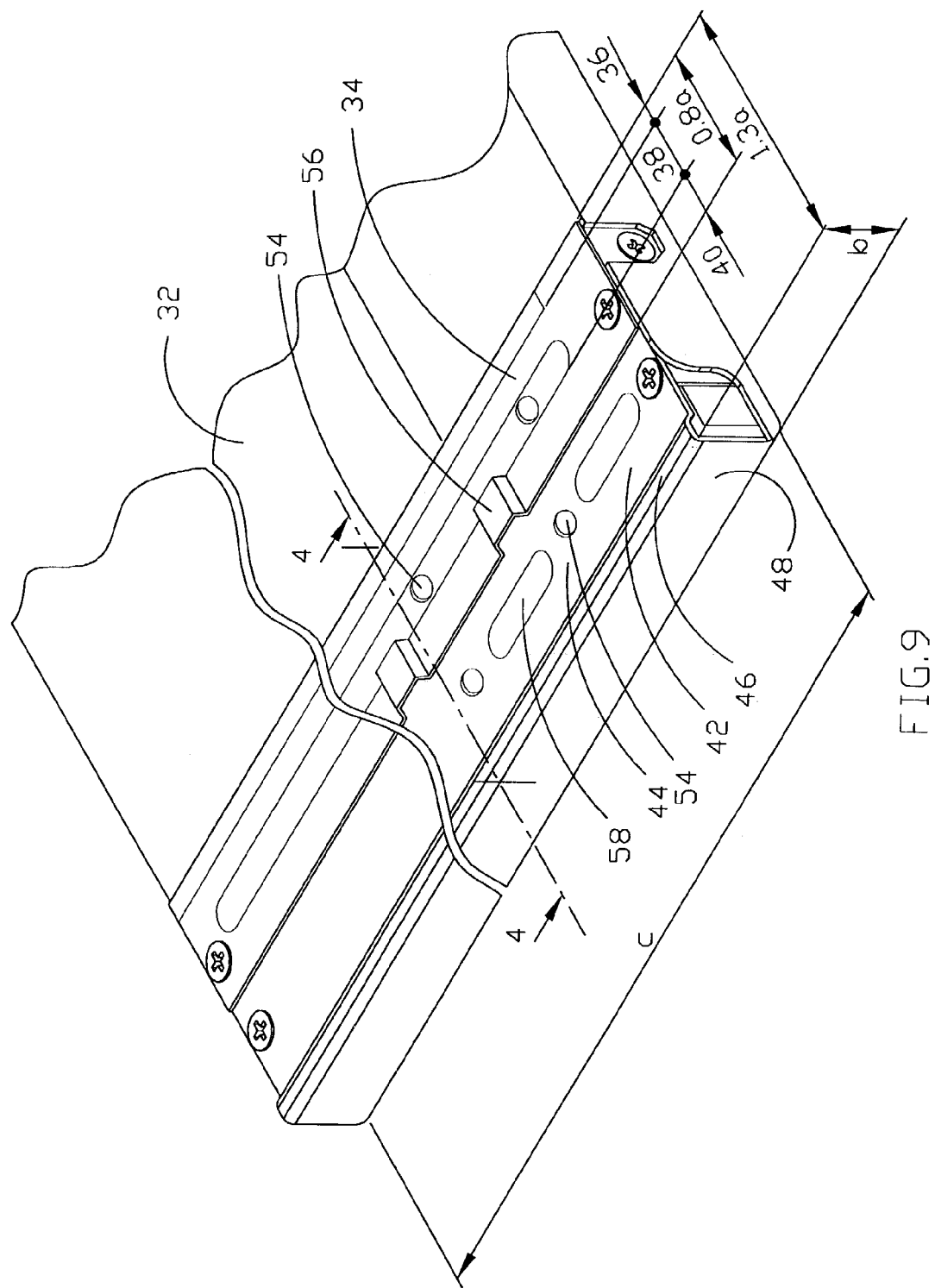
FIG. 9 is a three-dimensional perspective view of the second embodiment showing a side-part of a back-light module in the present art.

Obviously the present mechanism may be modified. As shown in FIG. 9, a designer of the back-light module increases the number of holes 54 on the lamp cover 34 and the lamp reflector 42 for cooling sooner, economizing cost of the lamp cover 34 and the lamp reflector 42, and decreasing the weight of the back-light module. For increasing the cooling area and the mechanism strength, design bulges 56 in the lamp cover 34 and bulges 58 on the lamp reflector 42.

Although specific embodiments have been illustrated and described, it will be obvious to those skilled in the art that various modifications may be made without departing from what intended to limit solely by the appended claims.

What is claimed is:

1. A back-light module, comprising:
   a light guide plate;
   a light source placed near one end of said light guide plate;
   a reflector for reflecting light from said light source having a fastening part and a reflecting plane on the opposing side of said fastening part for clipping and fastening said reflector onto said light guide plate; and
   a lamp cover including a first part that contacts with said light guide plate and a second part that connects with said first part and contacts with said fastening part of said reflector to fasten said fastening part on said light guide plate more stable without covering and shielding said reflector and said light guide plate, said first part and said second part both on only one side of said light guide plate.

2. The back-light module according to claim 1, wherein the shape of said fastening part of said reflector is a piece.

3. The back-light module according to claim 1, wherein said lamp cover does not wrap the outside of said reflector.

4. The back-light module according to claim 1, wherein said first part of said lamp cover includes plural holes.

5. The back-light module according to claim 1, wherein said second part of said cover includes plural holes.

6. The back-light module according to claim 1, wherein said first part of said lamp cover includes plural bulges.

7. The back-light module according to claim 1, wherein said second part of said lamp cover includes plural bulges.

8. The back-light module according to claim 1, wherein said fastening part of said reflector includes plural bulges.

9. The back-light module according to claim 1, wherein said fastening part of said reflector includes plural holes.

10. A back-light module, comprising:
    a light guide plate;
    a light source placed near one end of said light guide plate;
    a reflector for reflecting light from said light source having a fastening part and a reflecting plane on the opposing side of said fastening part for clipping and fastening said reflector onto said light guide plate; and
    a lamp cover including a first part, a second part and a third part said first part, said second part, and said third part being all on only one side of said light guide plate,
    said first part contacts with said light guide plate and connecting to an end of said second part,
    said second part connecting to said first part with an end, connecting to said third part with another end, and being not contact with said light guide plate, and
    said third part connecting to said second part with an end, and contacting with said fastening part of said reflector to fasten said fastening part on said light guide plate more stable without covering and shielding said reflector and said light guide plate.

11. The back-light module according to claim 10, wherein the shape of said fastening part of said reflector is a piece.

12. The back-light module according to claim 10, wherein said lamp cover does not wrap the outside of said reflector.

13. The back-light module according to claim 10, wherein said first part of said lamp cover includes plural holes.

14. The back-light module according to claim 10, wherein said second part of said lamp cover includes plural holes.

15. The back-light module according to claim 10, wherein said third part of said lamp cover includes plural holes.

16. The back-light module according to claim 10, wherein said first part of said lamp cover includes plural bulges.

17. The back-light module according to claim 10, wherein said second part of said lamp cover includes plural bulges.

18. The back-light module according to claim 10, wherein said third part of said lamp cover includes plural bulges.

19. The back-light module according to claim 10, wherein said fastening part of said reflector includes plural bulges.

20. The back-light module according to claim 10, wherein said fastening part of said reflector includes plural holes.

* * * * *